United States Patent [19]

Davis

[11] 4,343,634
[45] Aug. 10, 1982

[54] PROCESS FOR OPERATING A FLUIDIZED BED

[75] Inventor: Robert B. Davis, Nyack, N.Y.

[73] Assignee: Union Carbide Corporation, Danbury, Conn.

[21] Appl. No.: 246,916

[22] Filed: Mar. 23, 1981

[51] Int. Cl.³ .................. F17C 7/02; F25D 25/00
[52] U.S. Cl. ............................. 62/62; 34/10; 34/20; 34/54; 62/52; 62/57; 62/514 R
[58] Field of Search ............ 62/52, 53, 62, 63, 57, 62/514 R; 34/10, 20, 54

[56] References Cited

U.S. PATENT DOCUMENTS

| | | | |
|---|---|---|---|
| 2,640,333 | 6/1953 | Bailey | 62/57 |
| 3,440,831 | 4/1969 | Thompson | 62/63 |

Primary Examiner—Albert W. Davis
Attorney, Agent, or Firm—Saul R. Bresch

[57] ABSTRACT

In a process for operating a fluidized bed, wherein the bed particles have a Reynolds number of less than 20, at a predetermined cryogenic temperature comprising (i) bringing a cryogenic fluid into indirect contact with the bed; (ii) permitting the fluid to vaporize at the area of indirect contact whereby the bed is cooled; and (iii) utilizing the vapor from step (ii) to fluidize, and further cool, the bed, said cooling in steps (ii) or (iii) being from ambient temperature to the predetermined cryogenic temperature, the improvement comprising changing, continuously or stepwise, the minimum fluidizing mass flow of vapor as the temperature of the bed changes in accordance with a specified equation.

2 Claims, 1 Drawing Figure

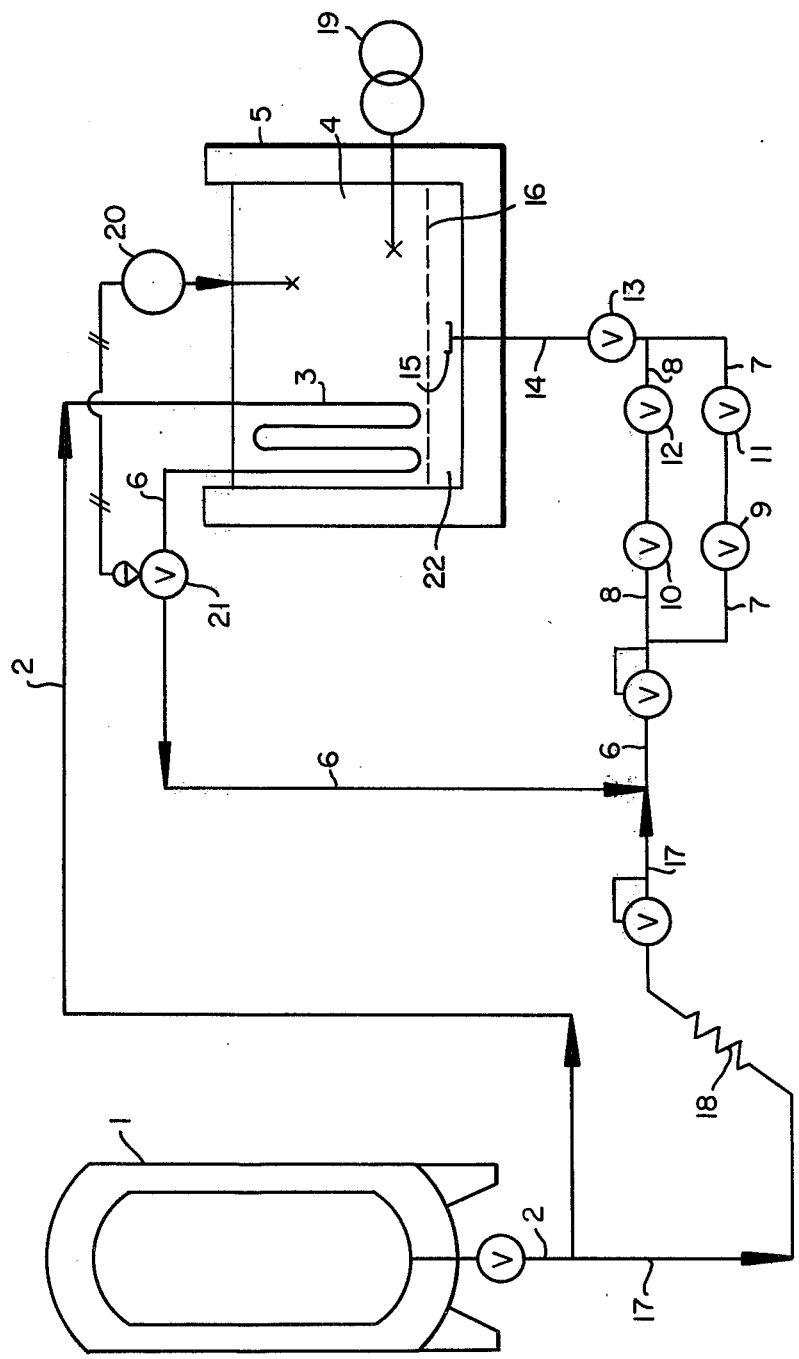

PROCESS FOR OPERATING A FLUIDIZED BED

FIELD OF THE INVENTION

This invention relates to a process for operating a fluidized bed at cryogenic temperatures.

DESCRIPTION OF THE PRIOR ART

Fluidized beds are used in a number of applications for the heating and cooling of materials. They exhibit good heat transfer characteristics; a uniform bed temperature profile; and the capability of being quickly turned on or off, i.e., fluidized beds are capable of storing heat or refrigeration. They are usually designed to utilize heat exchange panels or coils when the heating or cooling load significantly exceeds the capability of the fluidizing gas flow to provide it.

A fluidized bed, in its simplest form, is a bed of particulate material supported on a distribution plate through which gas or liquid is forced at a velocity sufficient to cause the particles to separate and to act as a fluid. Fluidized beds are essentially isothermal in character and exhibit very good heat transfer characteristics. The primary physical characteristics effecting a fluidized bed are particle size and distribution, particle density, fluid viscosity, and fluid density. Further, the viscosity of fluidizing gases drops off rapidly with a reduction in temperature, which necessitates an increase in fluidizing flow.

A fluidized bed operating at a temperature of minus 150° F. can cool an object to minus 100° F. as rapidly as if it were directly immersed in a liquid nitrogen bath at minus 320° F., but with a thirty percent reduction in nitrogen consumption. An object may also be cooled at a slower, controlled rate by turning the bed "off" and "on". The concept of a cryogenic fluidized bed is, thus, very promising in applications such as roll cooling, degating, metallurgical treatment, shrink fitting, and food freezing.

Various systems for fluidization and cooling are available. A first arrangement uses a separate fluid for cooling the bed by indirect heat transfer while a dry gas at ambient temperature is used for fluidization. For example, liquid argon or propane can be used to supply refrigeration while nitrogen gas is used for fluidization. In a second arrangement, where temperature control is not critical, a fluidizing gas at about desired bed temperature is used first for cooling by indirect heat transfer and then for fluidization. In still another and third arrangement, a liquid cryogen, such as liquid nitrogen, is used for cooling through vaporization by indirect heat transfer and the vapor is used for fluidizing and additional cooling. This arrangement assumes that the refrigeration load will always be greater than the refrigeration generated by vaporizing the fluidizing gas, which is the situation in most cryogenic applications. A variation of this arrangement provides additional fluidizing gas when fluidization is required and additional refrigeration is not.

A typical fluidized bed has two controlled conditions: bed temperature and fluidizing flow. While these conditions may be controlled manually, it is desirable, particularly in a cryogenic fluidized bed, to have bed temperature and fluidizing flow controlled automatically thus minimizing operator involvement. A third parameter for consideration in designing a fluidized bed is the minimization of gas consumption, especially if all of the generated vapor cannot be put to use in some other application.

In an application of the third arrangement mentioned above, liquid nitrogen is used to indirectly cool the bed by vaporization. The bed temperature is controlled by an on-off temperature switch activating a cryogenic solenoid valve. The cold vapor from the bed heat exchanger is then warmed up in an atmospheric vaporizer and part of the vapor is used to fluidize the bed while the remainder is vented or used in other applications. When the solenoid valve is closed (the bed is at temperature), liquid is taken directly from the reservoir and is vaporized to provide the fluidizing flow. This system has several advantages, which make it particularly suitable for small beds operating at moderately cold temperatures (between minus 160° F. and 0° F.): (i) very little cryogenic control equipment is needed; (ii) the temperature control is very simple; and (iii) an ambient rotameter may be used to set the fluidizing flow. Because the gas temperature exiting the vaporizer is essentially constant, the flow through the manual throttling valve is not affected by the changing gas temperature as the bed is cooling down or warming up. The two major disadvantages are that the fluidizing flow is manually changed to match the bed requirement as the bed temperature changes (considerably more flow is required to fluidize a cold bed than a warm bed) and the heat input introduced by the vaporizer is overcome by providing more refrigeration, i.e., liquid nitrogen). In view of the cost of liquid nitrogen, this penalty is unacceptable when considering large beds.

In dealing with the larger beds, it becomes apparent that less liquid nitrogen will be needed if the nitrogen vapor is used for fluidization directly as it exits the bed heat exchanger recognizing that this gas will always be slightly colder than the bed temperature. The problem, then, becomes how to match the required fluidizing flow with a gas which is itself changing in temperature particularly when the bed is cooling down, for as the temperature of the gas decreases, its density increases and its viscosity decreases. In fact, lowering the temperature causes the minimum mass flow required to just fluidize the bed to increase almost exponentially.

SUMMARY OF THE INVENTION

An object of this invention, therefore, is to provide a process for operating fluidized beds at cryogenic temperatures, particularly the larger beds, whereby the required fluidizing flow is provided as well as the predetermined bed temperature with minimal use of expensive liquid cryogen.

Other objects and advantages will become apparent hereafter.

According to the present invention, an improvement has been discovered in a process for operating a fluidized bed, wherein the bed particles have a Reynolds number of less than 20, at a predetermined cryogenic temperature comprising (i) bringing a cryogenic fluid into indirect contact with the bed, (ii) permitting the fluid to vaporize at the area of indirect contact whereby the bed is cooled; and (iii) utilizing the vapor from step (ii) to fluidize, and further cool, the bed, said cooling in steps (ii) and (iii) being from ambient temperature to the predetermined cryogenic temperature.

The improvement comprises changing, continuously or stepwise, the minimum fluidizing mass flow of vapor as the temperature of the bed changes in accordance with the following equation:

$$A = 1.1 \times \frac{(BC)^2}{150} \times \left(\frac{D-E}{F}\right) \times g \times \left(\frac{H^3}{1-H}\right) \times J \times E$$

wherein:
A=minimum fluidizing mass flow of vapor in grams per second
B=sphericity of bed particles
C=largest particle diameter in centimeters
D=bulk density of particles in grams per cubic centimeter
E=vapor density at temperature of the bed in grams per cubic centimeter
F=viscosity of the vapor at temperature of the bed in grams per centimeter per second
g=980 centimeters per second squared
H=voidage
J=bed area in square centimeters the bed in grams per centimeter per second
g=980 centimeters per second squared
H=voidage
J=bed area in square centimeters It will be understood that B, C, D, g, H, and J are constant for each particular fluidized bed. E and F, of course, change with each change in temperature and can be determined for a given temperature by reference to technial publications such as the CRC Handbook of Chemistry and Physics, 60th edition, Weast et al, publ. CRC Press, Inc., Boca Raton, Fla., 1979, pages B-103 and F-60 or Cryogenics and Industrial Gases Data Book May/June 1974, pages 77 and 78, or may be calculated using various well known theoretical or empirical formulae, e.g., $$E = \frac{MW \times P}{RT}$$

wherein:
MW=molecular weight of the gas
P=absolute pressure in grams per square centimeter
T=absolute temperature in °K.
R=gas constant in consistent units; and $$F = FO \times \left(\frac{T}{273.1}\right)^n$$

wherein:
FO=viscosity at 0° C.
T=absolute temperature in °K.
n=empirically derived value from data. See Chemical Engineers Handbook, 3rd edition, Perry, publ. McGraw-Hill Book Co. Inc., 1950, page 371.

BRIEF DESCRIPTION OF THE DRAWING

The sole FIGURE of the drawing is a schematic flow diagram illustrating an embodiment of the invention.

DESCRIPTION OF THE PREFERRED EMBODIMENT

The cryogenic temperatures at which subject process can be carried out are in the range of ambient temperature of about minus 40° F. to about minus 250° F. and are preferably in the range of about minus 80° F. to about minus 160° F. The cryogenic fluid most commonly used in fluidized beds is liquid nitrogen, but argon, helium, and carbon dioxide in liquid form can be used as well as many other gases, liquifiable at low temperatures, which are inert insofar as the apparatus materials and the medium to be fluidized are concerned.

The particles used in the bed can be alumina, sand, glass, ceramic powder, metals, salts, or any relatively fine material, which is inert to the other materials used in the process and will not break up to any appreciable extent. Particle size diameters are typically in the range of about 44 microns to about 177 microns. As noted, the particles must have a Reynolds number of less than 20.

Particle Reynolds number is determined by and equal to the following equation:

$$(DP \times VO \times PG)/MU$$

wherein:
DP=particle diameter in centimeters
VO=superficial fluid velocity (measured on an empty tube basis) through a bed of solids in centimeters per second.
PG=fluid density (vapor) in grams per cubic centimeter
MU=viscosity of vapor in grams per centimeter-second.

Sphericity of bed particles (B) is equal to the surface area of a sphere divided by the surface area of a particle having the same volume as the sphere, e.g., the sphericity of alumina (aluminum oxide) is 0.6. The largest particle diameter (C) of any particle in the bed may be determined by using conventional Tyler standard sieves. A typical diameter is 0.014 centimeter for alumina. The bulk density of the particles in the bed in grams per cubic centimeter (D) is determined by using conventional references or by weighing a known volume of the particles. The bulk density for alumina is 2.08 grams per cubic centimeter. Voidage (H) is defined as the free volume in the emulsion phase of a bubbling fluidized bed which is considered dimensionless and is given for minimum fluidizing conditions or, in other words, those conditions which will just fluidize the bed. Voidage for alumina is 0.6, most particulate materials having voidages in the range of about 0.45 to about 0.7. Bed areas (J) range from about 100 square centimeters to tens of thousands of square centimeters. The gravitational constant is 980 centimeters per second squared and this is represented by the letter g.

Referring to the drawing:

The liquid nitrogen is kept in storage tank 1 under a pressure, for example, of 35 or 100 pounds per square inch gauge (psig). It passes along line 2 until it reaches tube 3 which is immersed in bed 4, a bed of alumina particles residing in fluidized bed container 5 on diffusion plate (or distribution plate) 16. The plate is so constructed that the fluidizing gas passes upward and is duffused in bed 4, but bed particles are not permitted to fall through. Tube 3, which is represented in the drawing as a double U shaped tube, can be a heat exchange panel, a coiled tube, a series of continuous U shaped tubes, or several of each, such as parallel coils, each having its own inlet and outlet valves. The liquid nitrogen vaporizes in tube 3 cooling bed 4 and the vapor passes through line 6, now, for example, at 20 or 75 psig, into a flow system having two parallel circuits. One of the circuits can be designated as the high flow circuit and is represented by line 8, solenoid valve 10, and throttling valve 12 and the other circuit can be designated as the low flow circuit and is represented by line 7, solenoid valve 9, and throttling valve 11. The vapor passes through one or the other or both of the circuits along line 14 through valve 13 into dual pipe 15 which is located in plenum 22 and up through diffusion plate 16 at a velocity sufficient to provide fluidization, the minimum fluidizing mass flow of the vapor being in accordance with the above equation.

A practical flow system between lines 6 and 14 is comprised of dual set point temperature switch 19 or two separate switches together with the high flow and low flow circuits. Throttling valves 11 and 12 are selected for accurate, reproducible settings. They have equal percentage trim with turn indicators. Temperature switch 19 and solenoid valves 9 and 10 are wired so that the low flow circuit is open down to some preselected temperature at which point the high flow circuit opens and low flow circuit closes. At some still lower second temperature, both circuits are open. Mass flows of about 2 to about 5 times the minimum mass flow required to just fluidize bed 4, and preferably of about 2 to about 4 times the minimum mass flow can be used. As an example, starting with vapor at 80° F. and using twice the minimum mass flow, the low flow circuit can be opened while the bed temperature decreases from 80° F. to minus 20° F.; then, the high flow circuit takes over at 2.35 times the minimum mass flow while the bed temperature decreases from minus 20° F. to minus 180° F.; and, finally, both the high flow circuit and low flow circuit are in operation at 2.35 times the minimum mass flow while the bed temperature decreases from minus 140° F. to liquid nitrogen temperature. It will be noted that the flows and temperature set points are selected so that the flow will always be greater than the minimum mass flow required to fluidize bed 4 over the entire bed operating temperature range and yet well below a flow which will carry the particles out of bed 4.

The system is preferably set up to allow adjustment of throttling valves 11 and 12 using ambient gas. This obviates the need for an expensive cryogenic mass flow meter or recalibrating a rotameter for cold gas. Simply, the low flow circuit is activated and the flow diverted through a rotameter (not shown). A rotameter can be described as a simple flowmeter which measures quantity per hour. Typically, the flow is increased until bed 4 just becomes fluidized. This is the minimum mass flow. The rotameter reading "x" is then noted. The flow is then further increased to "2x". The "calibrate" button is then pushed which closes the low flow circuit and opens the high flow circuit. The high flow circuit is then adjusted to a value "3.5x". No further adjustments are made.

Bed temperature controller 20 is preferably of the pneumatic proportioning type without reset. The controller drives cryogenic control valve 21. Since, in most cases, some refrigeration is desirable, e.g., to overcome heat leaks, controller 20 will maintain a continuous, small flow through tube 3. This constant flow maintains a more uniform bed temperature, eliminates erratic on-off pressure pulsations in the fluidizing gas circuit, and provides cold gas for fluidizing, thus minimizing total nitrogen consumption.

In the event that a smoother fluidizing flow (or a close fit to the mass flow curve) is desired, an electronic control system can be used to generate a continuous signal of the $A = K/T^2$ form, wherein K is an empirically derived constant and T=temperature, to match the curve. For example, an electronic temperature transmitter could feed a 4 to 20 milliamp signal to an exponential computing module followed by a divider module. The output signal could then be put into a milliamp to pneumatic transducer to operate a 3 to 15 psig cryogenic control valve. While this system is more sophisticated, it has not been found to be necessary to a practical and economic commercial operation.

It is noted that conventional relief valves are placed throughout the system for the purpose of safety or the prevention of damage through malfunction. These refief valves are not shown.

The most important feature of subject process is the adjustment of gas flow to more closely meter the fluidizing flow requirement as a function of temperature. Another feature of the process is the ability to provide the fluidizing gas at a temperature slightly colder than the bed to facilitate bed cooldown and minimize cryogenic consumption. This is accomplished by providing tube 3 in which the liquid cryogen is first vaporized and then warmed to a temperature slightly less than bed temperature. The refrigeration from the vaporized cryogen assists in the cooldown and low temperature maintenance of bed 4. Temperature controller 20, in combination with throttling valve 21, maintains bed 4 at the desired temperature by reducing the flow through tube 3 and tempering the cold vapor exiting tube 3 along line 6 with ambient gas at, for example, pressures of 25 or 80 psig, prepared by warming the liquid nitrogen in line 17 in vaporizer 18 and controlling the entry of the gas through line 17 into line 6 by use of a valve. A third feature is the provision of a capability for recovering gas at pressure for use in other applications. This can be effected when the refrigeration requirement exceeds the gas flow required for fluidization. The excess cryogen is vaporized in tube 3 and the excess gas is vented at, for example, 30 or 90 psig, through a back pressure control valve and recovered (vent and valve are not shown). A fourth feature permits the use of two different cryogen liquids or a cryogenic liquid and a gas, cold or at ambient. In this case, the vapor in line 6 does not proceed to the parallel circuits, but is recovered just as the excess gas is recovered above. This is an alternative where, for example, high value argon can be used both for refrigeration and some other application while lower cost nitrogen can be used for fluidizing the bed, fluidizing gas being subsequently lost to the atmosphere. A fifth feature is a controlled purge system, which maintains a moisture free atmosphere within the bed. A cold nitrogen purge may be admitted above the bed to minimize warm-up of the cold particles. A low flow (a small fraction of fluidizing flow) is maintained when the bed cover (not shown) is closed and a somewhat higher flow when the cover is opened, but bed fluidization is not desired. The piping for this purge system is not shown. It will be understood by those skilled in the art than when the fluidization is being carried out, the fluidizing gas acts as a purge, the bed is uncovered, and the purge system is turned off. A sixth feature of the process is the capability of controlling and varying the cooling rate by turning the bed "on" and "off" in some programmed manner. This is accomplished by maintaining a low flow of cold gas in the system, which makes it easier to cool the bed down to operating temperature. The controls for such a programmed system are not shown.

The invention is illustrated by the following example.

EXAMPLE

This example is conducted on a laboratory scale, and as described above and in the drawing. The fluidized bed is designed around an 11 inch×17.5 inch×5 foot deep vertical hopper. A distributor plate (diffusion plate 16) is welded to a plenum (22) which is installed in the bottom of a chamber. Approximately 375 pounds of minus 140 mesh aluminum oxide powder is loaded on top of the distributor plate for use as the fluidized medium. The powder has a bulk density of 116 pounds per cubic foot (specific gravity=1.87) and provides a bed depth of 30 inches (76.2 centimeters). Heat transfer coils (tube 3) made of copper tubing are installed on the internal hopper walls. Liquid nitrogen from a cylinder (reservoir 1) is fed through these coils where it is vaporized and the resultant gas is used for fluidizing the bed. Excess gas is vented through a cryogenic back pressure regulator. A second regulator is used to supply reduced pressure fluidizing gas to a temperature activated control manifold (see parallel circuits with solenoid valves 9 and 10 and throttling valves 11 and 12). The flow control manifold is activated by a dual set point pyrometer (dual switch 19). The bed temperature is controlled with proportional band and reset (temperature controller 20). The temperature activates a 3 to 15 psig cryogenic control valve (valve 21) which throttles the cold gas exiting the bed and allows it to be tempered with ambient nitrogen to maintain the desired bed temperature. In subsequent tests, the fluidizing flow regulator is removed because of its limited capacity and the bed pressure valve is set at 80 psig. The limited heat transfer area in the bed coils results in liquid exiting the coils when the bed temperature is reduced below minus 260° F. The solution to this latter problem will be discussed below.

Start-up of the warm bed is accomplished as follows: the liquid nitrogen cylinder is pressurized to 70 psig. The temperature controller is set to the desired bed operating temperature, i.e., minus 180° F. The back pressure regulator is set to relieve at 60 psig. The ambient nitrogen supply regulator is set to open at 58 psig. The fluidizing flow regulator is set at 30 psig. This regulator may be eliminated if the back pressure regulator can maintain fairly constant pressure on the control manifold. The two manual throttling valves (11, 12) located downstream of the two solenoid valves (9, 10) are set as follows: with the bed temperature at 70° F., the low flow solenoid is opened and the flow as read on the rotameter is set at twice the observed minimum flow (about 42 pounds per hour). The low flow solenoid is closed, and the high flow solenoid is opened and its throttling valve is adjusted to approximately 3.5 times the minimum required flow or 74 pounds per hour. The set points on the dual set point controller are set at minus 65° F. for the high flow valve and minus 150° F. when both valves are to be open. These values are selected to cover the maximum expected bed temperature operating range. If the lowest desired bed temperature is, for example, minus 180° F., the selected flow valves are set to provide lower flows and the temperature switch set points, warmer. The objective in selecting the set points and the fluidizing flows is to minimize excess nitrogen fluidizing flow, i.e., nitrogen loss, while maintaining fluidizing flow over the required temperature span.

For minimum nitrogen consumption, flow rates and temperature switch set points are established as follows: (i) the lowest temperature at which the bed will be required to operate as well as the normal range of operation (exclusive of cooldown) is determined; (ii) using the equation, mass flow is determined for a series of bed temperatures stepwise down to the operating range (this can be accomplished in three or more steps or continuously, if the process is controled by a computer). The first step can take the bed temperature from ambient to minus 65° F., using low flow; the second step can take the bed temperature form minus 65° F. to minus 160° F. using high flow; and the third step from minus 160° F. to minus 220° F. using both low and high flow. The maximum mass flow used, as a practical matter, is always less than the theoretical maximum, which is the sum of the low flow plus the high flow, and is related to manifold pressure, i.e., the pressure at dual pipe 15, in that the higher the manifold pressure, the greater the percentage of actual maximum mass flow as against theoretical maximum mass flow, e.g., for a manifold pressure of 80 psig, the maximum flow will be about 85 percent of the theoretical maximum.

Throttling valves 11 and 12 are adjusted when the bed is warm using a rotameter. In normal low temperature operation the rotameter is bypassed since it is not suitable for cryogenic service. Temperature controller 20, which also controls the supply of ambient nitrogen for tempering, provides the ambient nitrogen at 5 to 10 psig lower than the pressure of the liquid nitrogen to insure that the ambient nitrogen is not inadvertently mixed with the cold vapor passing through line 6.

The fluidized medium used in the bed is aluminum oxide powder, the particles of which have a Reynolds number of 4.5.

| Size Analysis (Alpine Jet Sieve, 20 gram sample) | |
|---|---|
| U.S. Mesh Size | Percent Passing Thru Screen |
| 100 mesh | 100.0 |
| 140 mesh | 99.0 |
| 170 mesh | 65.5 |
| 200 mesh | 27.5 |
| 325 mesh | 1.0 |

Bulk density=116 pounds/cubic foot.
Bed pressure drop=1.66 inches of water per inch of depth or 0.72 pounds per square inch (psi) per foot of bed depth.
Minimum fluidizing flow per square foot:

| Bed temperature in °F. | SCFM* | pounds per hour | plenum pressure in psig |
|---|---|---|---|
| +60 | 3.6 | 15.6 | 4.2 |
| 0 | 4.2 | 18.4 | 4.9 |
| −40 | 5.5 | 23.7 | 6.0 |
| −100 | 7.3 | 31.7 | 8.2 |
| −137 | 9.5 | 41.1 | 11.0 |
| −185 | 13.1 | 56.9 | 17.4 |

*SCFM = standard cubic feet per minute.

Heat transfer rates are obtained by immersing a 2¾ inch diameter brass ball weighing 2.14 pounds into the fluidized bed and recording the cooldown rate as measured by a thermocouple located in the center of the ball. The tests are run at several bed temperatures.

| Bed temperature (°F.) | Time to cool to temperature "T" from ambient in minutes | | |
|---|---|---|---|
| | T = −50° F. | T = −100° F. | T = −150° F. |
| −95 | 2.4 | — | — |
| −150 | 1.5 | 2.7 | — |
| −180 | 1.2 | 2.1 | 3.7 |
| −260 | 1.4 | 2.3 | 3.2 |

Calculated surface heat transfer coefficients (h) are as follows:

| Bed temperature (°F.) | h in BTU/hour-foot squared-°F. |
|---|---|
| −95 | 52.4 |
| −150 | 49.8 |
| −180 | 56.6 |
| −260 | 35.6 |

The equation used in subject process is derived from equations in the reference "Fluidization Engineering", Kunii and Levenspiel, publ. R. E. Krieger Publishing Company, Huntington, N.Y., 1977, pages 65, 73, and 76 to 78.

As noted, the primary considerations in the design of a fluidized bed used for cooling to cryogenic temperatures are the cooling requirements and the size of the bed. This is particularly true if the nitrogen gas in excess of that required for fluidization can be used to supplement or replace gas used in other processes. Obviously, a bed which is significantly oversized will require more fluidizing flow and thus may have less nitrogen available for export. Also, if the heat load imposed on the bed is less than the refrigeration obtained from the fluidizing gas, e.g., about 6000 BTU/hour-foot squared bed at minus 150° F., it is expected that no gas will be available for export.

The bed itself is to be suitably sized and structured for the objects to be cooled. It preferably has an adequate wall heat transfer area to insure complete vaporization of the maximum liquid nitrogen flow for the minimum anticipated operating temperature. Ideally, this heat transfer area is sufficient to warm the liquid nitrogen to within a few degrees of bed temperature. If this area is marginal, a low temperature alarm in the gas line exiting the bed is suggested so as to prevent liquid from entering the plenum. Commercial beds are preferably equipped with a minimum of 4 inches of urethane or equivalent insulation and are provided with insulated covers to minimize refrigeration loss and moisture pickup; a small purge of nitrogen gas is maintained during "off" points to exclude moisture. Materials of construction are conventional, suitable for cryogenic service, and are fabricated to accommodate thermal expansion and contraction. Examples of these materials are 300 AISI Series stainless steels and aluminum.

The equation is applied to the example using a series of three selected temperatures as follows:

$$A = 1.1 \times \frac{(BC)^2}{150} \times \left(\frac{D-E}{F}\right) \times g \times \left(\frac{H^3}{1-H}\right) \times J \times E$$

wherein:
A = minimum fluidizing mass flow of vapor in grams per second
B = sphericity of bed particles = 0.6
C = largest particle diameter in centimeters = 0.0104
D = bulk density of particles in grams per cubic centimeter = 1.87
E = vapor density at temperature of the bed in grams per cubic centimeter = see below
F = viscosity of the vapor at temperature of the bed in grams per centimeter per second = see below
g = 980 centimeters per second squared
H = voidage = 0.6
J = bed area in square centimeters = 1244
Note: all units are CGS

| Temperature of bed (°F.) | E | F |
|---|---|---|
| +80 | 0.0012 | 0.00017 |
| −60 | 0.0015 | 0.000135 |
| −140 | 0.0020 | 0.000115 | therefore:

| Temperature of bed (°F.) | A |
|---|---|
| +80 | 2.48 |
| −160 | 3.90 |
| −140 | 6.10 |

The low flow is set to provide a mass flow (A) of 3.9 grams per second at +80° F.; the high flow is set to provide a mass flow (A) of 610 grams per second at −60° F.; and the high flow/low flow is set to provide a mass flow (A) of 8.5 grams per second at −140° F.

To determine the availability of refrigeration, the following equation is used:

$$Q = \frac{A}{J} \times R$$

wherein
Q = refrigeration available at bed temperature T in calories per second
A and J are as above
R = enthalpy of nitrogen at bed temperature T in calories per gram
T = bed temperature in °F.

The pressure drop using minus 140 mesh aluminum oxide from the top of diffusion plate 16 to the surface of the alumina is
P = 1.66 h
wherein
P = pressure drop in inches of water or grams per centimeter squared
h = bed depth in inches or centimeters It is desirable for square or cylindrical beds operating at very low temperatures with high heat loads to provide sufficient heat transfer area or fluidized bed walls to completely vaporize the liquid nitrogen required for fluidization and to superheat it to within a few degrees below the bed temperature in order to obtain maximum efficiency and for the pressure regulator (not shown) provided with storage tank 1 to be able to maintain a costant pressure over the full range of operating conditions.

A preferred design of tube 3 is to suspend several parallel coils in the fluidized bed, at least two parallel coils and preferably four such coils. The reason for these parallel coils is that, as the liquid nitrogen vaporizes in a single coil, it causes vapor slugs, which produce undesirable pressure fluctuations causing liquid nitrogen to percolate out of the coil due to vapor acceleration. Parallel coils tend to reduce the effect of these pressure pulsations and also to reduce liquid carryover.

I claim:

1. In a process for operating a fluidized bed, wherein the bed particles have a Reynolds number of less than 20, at a predetermined cryogenic temperature comprising (i) bringing a cryogenic fluid into indirect contact with the bed; (ii) permitting the fluid to vaporize at the area of indirect contact whereby the bed is cooled; and (iii) utilizing the vapor from step (ii) to fluidize, and further cool, the bed, said cooling in steps (ii) and (iii) being from ambient temperature to the predetermined cryogenic temperature, the improvement comprising changing, continuously or stepwise, the minimum fluidizing mass flow of vapor as the temperature of the bed changes in accordance with the following equation:

$$A = 1.1 \times \frac{(BC)^2}{150} \times \left(\frac{D-E}{F}\right) \times g \times \left(\frac{H^3}{1-H}\right) \times J \times E$$

wherein:
A = minimum fluidizing mass flow of vapor in grams per second
B = sphericity of bed particles
C = largest particle diameter in centimeters
D = bulk density of particles in grams per cubic centimeter
E = vapor density at temperature of the bed in grams per cubic centimeter
F = viscosity of the vapor at temperature of the bed in grams per centimeter per second
g = 980 centimeters per second squared
H = voidage
J = bed area in square centimeters 2. In the process defined in claim 1 wherein, in step (i), the fluid is passed through coiled tubes, which are in contact with the bed and permit indirect contact between the fluid and the bed, the improvement comprising providing at least two coiled tubes in parallel.

* * * * *